US007447815B2

(12) United States Patent
Weaver et al.

(10) Patent No.: US 7,447,815 B2
(45) Date of Patent: Nov. 4, 2008

(54) ARCHITECTURE FOR OPTIMIZING AUDIO AND VIDEO OPERATING MODES FOR MULTIMEDIA DEVICES BASED ON PREDETERMINED HIERARCHICAL ORDER OF AVAILABLE AUDIO AND VIDEO OPERATING MODES

(75) Inventors: David John Weaver, Noblesville, IN (US); William Henry Mengel, Westfield, IN (US); Lawrence Carl Pesce, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/381,114

(22) PCT Filed: Sep. 26, 2001

(86) PCT No.: PCT/US01/30136

§ 371 (c)(1),
(2), (4) Date: Mar. 21, 2003

(87) PCT Pub. No.: WO02/27472

PCT Pub. Date: Apr. 4, 2002

(65) Prior Publication Data

US 2004/0128402 A1 Jul. 1, 2004

Related U.S. Application Data

(60) Provisional application No. 60/235,869, filed on Sep. 27, 2000.

(51) Int. Cl.
*G06F 3/00* (2006.01)

(52) U.S. Cl. .................. 710/72; 710/8; 710/9; 710/10; 710/11; 709/202; 709/203; 713/1; 713/2; 725/39; 725/44; 725/47; 725/118; 725/120

(58) Field of Classification Search ............... 710/8–11, 710/3, 14, 72; 709/202, 203, 220, 249; 725/120, 725/118, 131, 39, 44, 47; 713/1, 2
See application file for complete search history.

(56) References Cited

U.S. PATENT DOCUMENTS 5,341,426 A * 8/1994 Barney et al. ................ 713/171

(Continued)

FOREIGN PATENT DOCUMENTS

WO     WO 00/16531     3/2000

OTHER PUBLICATIONS

"Software Control of Multimedia Device Interconnection", IBM Technical Disclosure Bulletin, Sep. 1993, vol. 36, Issue No. 9b, pp. 569-572.

(Continued)

*Primary Examiner*—Tammara R Peyton
(74) *Attorney, Agent, or Firm*—Joseph J. Laks; Harvey D. Fried; Joel M. Fogelson

(57) ABSTRACT

An architecture for automatically optimizing audio and video modes available from interconnected multimedia devices. When one multimedia device is connected with another multimedia device, the devices communicate with each other to determine the modes available from both devices. The devices then compare the different combinations of available audio and video modes and determine which mode combination yields the optimal operating efficiency for outputting a media service.

19 Claims, 6 Drawing Sheets

U.S. PATENT DOCUMENTS

| | | | | |
|---|---|---|---|---|
| 5,654,738 A | * | 8/1997 | Spurlock | 345/699 |
| 6,032,202 A | * | 2/2000 | Lea et al. | 710/8 |
| 6,052,750 A | | 4/2000 | Lea | 710/72 |
| 6,237,049 B1 | * | 5/2001 | Ludtke | 710/8 |
| 6,263,502 B1 | * | 7/2001 | Morrison et al. | 725/47 |
| 6,546,419 B1 | * | 4/2003 | Humpleman et al. | 709/223 |
| 6,618,764 B1 | * | 9/2003 | Shteyn | 709/249 |
| 6,839,903 B1 | * | 1/2005 | Shintani et al. | 725/39 |
| 7,404,187 B2 | * | 7/2008 | Baird et al. | 719/313 |
| 2001/0005843 A1 | | 6/2001 | Tokashiki | |
| 2001/0007105 A1 | | 7/2001 | Brotz et al. | |
| 2001/0010523 A1 | | 8/2001 | Sezan et al. | |

OTHER PUBLICATIONS

Havi Organization, Havi, the A/V digital network revolution, paper, pp. 1-7, 1999.

Greg Rogers, CyberTheater The Internet Journal of Home Theater, HDTV & Front Projection Systems, pp. 1-21.

* cited by examiner

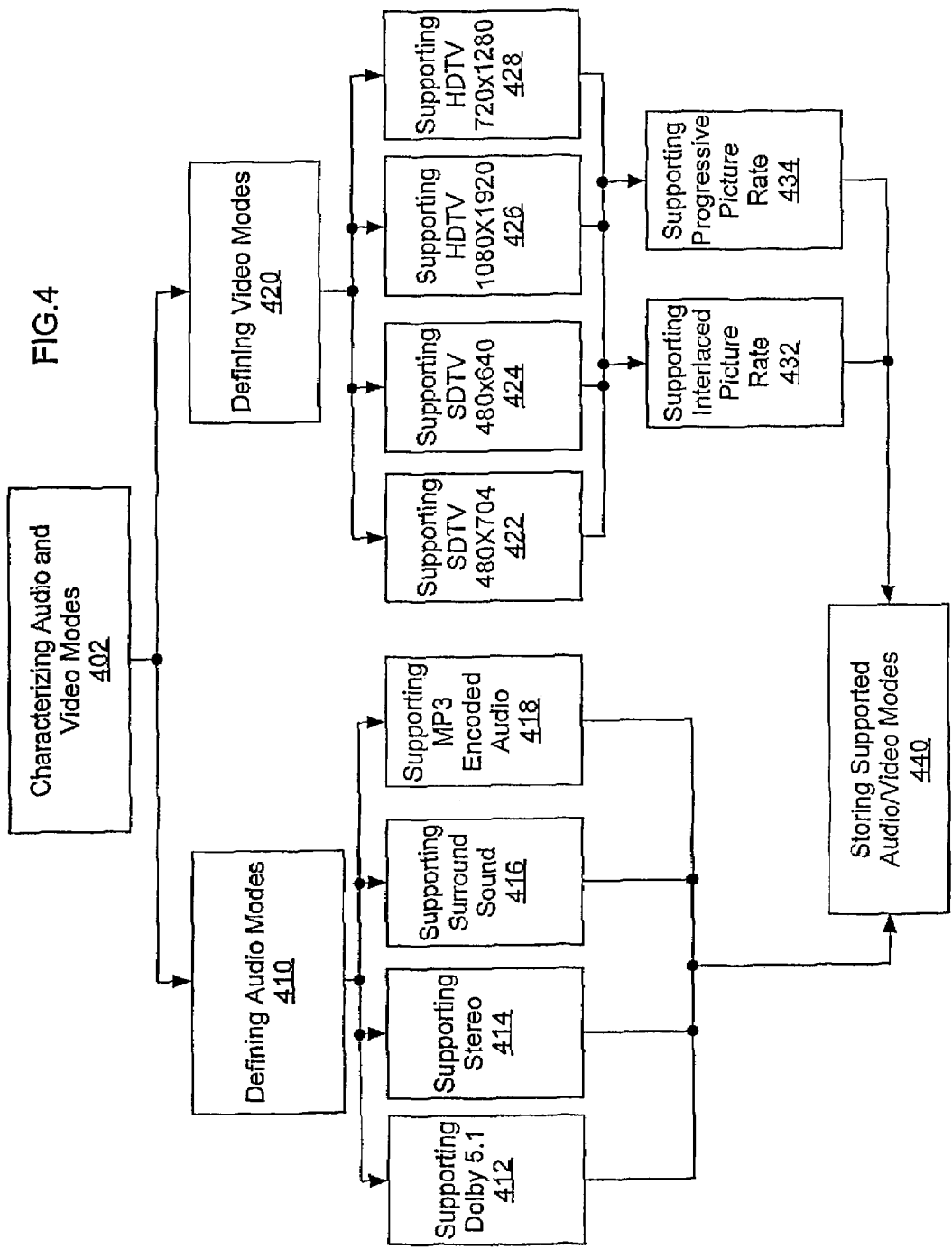

FIG. 5

| DEVICE ID (IDENTIFICATION) | DEVICE TYPE |
|---|---|
| HIDEF_TV | HIGH DEFINITION TELEVISION |
| SDDEF_TV | STANDARD DEFINITION TELEVISION |
| AV_RECEI | AUDIO/VIDEO RECEIVER |
| DVD_PLAY | DIGITAL VIDEO DISC PLAYER |
| VTR_PLAY | VIDEO TAPE PLAYER |
| STR_PLAY | STREAMING MEDIA PLAYER |
| PC_COMPU | PERSONAL COMPUTER |
| VID_GAMES | VIDEO GAME |
| SET_TOPB | SET TOP BOX |
| MODEM_CA | MODEM-CABLE |
| MODEM_DS | MODEM-DSL |
| MODEM_56 | MODEM-56K |
| SPEAK_FR | SPEAKER - FRONT RIGHT |
| SPEAK_FL | SPEAKER - FRONT LEFT |
| SPEAK_CN | SPEAKER - CENTER CHANNEL |
| SPEAK_SW | SPEAKER - SUBWOOFER |
| SPEAK_RR | SPEAKER - REAR RIGHT |
| SPEAK_RL | SPEAKER - REAR LEFT |
| PVR_PLAY | PERSONAL VIDEO RECORDER |
| DISP_MON | DISPLAY MONITOR |
| DSS_SERV | DIGITAL SATELLITE SYSTEM |

FIG. 7

| OPERATION COMMAND | COMMAND EXPLANATION |
|---|---|
| ACKN | ACKNOWLEDGED |
| CONN | CONNECTING AN UNDEFINED DEVICE |
| DATE | DATE STAMP |
| DEVE | DEVICE IDENTIFICATION REQUEST |
| LIST | LISTING OF ALL STATES |
| MEDA | MEDIA DEFINITION |
| NACK | NOT ACKNOWLEDGED |
| NULL | NULL (SPACES OUT COMMANDS) |
| QUDV | QUERY FOR A DEVICE TYPE |
| QUER | A QUERY FOR THE AVAILABLE STATES |
| QUST | QUERY FOR A STATE |
| RECE | RECEIVE STATE INFORMATION |
| SEDE | SELECTING A DEVICE TYPE |
| SEST | SELECTING A STATE |
| STAT | START STATE |
| STOP | STOP STATE |
| TERM | TERMINATE THE STATE OPTIMIZATION |

FIG. 6

| DEVICE ID (IDENTIFICATION) | STATE ID (MODE IDENTIFICATION) | EXPLANATION OF STATE/MODE |
|---|---|---|
| HIDEF_TV | 1080I1920 | 1080 SCAN LINES, 1920 HORIZONTAL PIXELS |
| | 720_1280 | 720 SCAN LINES, 1280 HORIZONTAL PIXELS |
| | 16_9XXXX | 16 BY 9 ASPECT RATIO |
| | 4_3XXXXX | 4 BY 3 ASPECT RATIO |
| | 60_INTER | 60 HZ INTERLACED PICTURE RATE |
| | 60_PROGE | 60 HZ PROGRESSIVE PICTURE RATE |
| | 30_PROGE | 30 HZ PROGRESSIVE PICTURE RATE |
| | 24_PROGE | 24 HZ PROGRESSIVE PICTURE RATE |
| SDDEF_TV | 480_704 | 480 SCAN LINES, 704 HORIZONTAL PIXELS |
| | 480_640 | 480 SCAN LINES, 640 HORIZONTAL PIXELS |
| | 16_9XXXX | 16 BY 9 ASPECT RATIO |
| | 4_3XXXXX | 4 BY 3 ASPECT RATIO |
| | 60_INTER | 60 HZ INTERLACED PICTURE RATE |
| | 60_PROGE | 60 HZ PROGRESSIVE PICTURE RATE |
| | 30_PROGE | 30 HZ PROGRESSIVE PICTURE RATE |
| | 24_PROGE | 24 HZ PROGRESSIVE PICTURE RATE |
| | COMPSITE | COMPOSITE VIDEO MODE |
| | SUPERVHS | SUPER-VIDEO MODE |
| | COMPONET | COMPONENT VIDEO MODE |
| AV_RECEI | AAC_MODE | AAC MODE |
| | AC_3_MOD | AC_3 SOUND |
| | MONO_MOD | MONO SOUND |
| | STRE_MOD | STEREO MODE |
| | SURR_MOD | SURROUND SOUND |

600

ARCHITECTURE FOR OPTIMIZING AUDIO AND VIDEO OPERATING MODES FOR MULTIMEDIA DEVICES BASED ON PREDETERMINED HIERARCHICAL ORDER OF AVAILABLE AUDIO AND VIDEO OPERATING MODES

This application claims the benefit under 35 U.S.C. § 365 of International Application PCT/US01/30136 filed Sep. 26, 2001, which claims the benefit of U.S. Provisional Application No. 60/235,869, filed Sep. 27, 2000.

This invention is related to the field of selecting audio and video output modes of multimedia devices.

A user operated audio or video device (multimedia device) such as a digital video disc (DVD) player or an audio/video receiver typically supports a plurality of operating modes. For example, a DVD player playing a media service, such as a movie from a DVD disc, operates in different audio output modes (e.g., mono, stereo, DOLBY™ 5.1) and different video output modes (e.g., high definition (HD), standard definition (SD), (4:3) image aspect ratio, and (16:9) image aspect ratio) based upon information or metadata relating to capabilities of the multimedia device. A user operating the multimedia device then has to designate the desired audio and video output modes that the multimedia device provides a media service. In the DVD player example, a user instructs the DVD player to provide the media service with audio in a stereo format (audio mode) and the video in a HD format with a 16:9 image aspect ratio (video mode).

A user operating a multimedia device with multiple output modes has to have a sufficient understanding about the interoperability of output modes to fully use the capabilities of the multimedia device. Some users leave their multimedia devices in a factory-selected/default mode because they do not know about the differences between the multiple output modes or how to select a specific output mode. For example, a user may not know the differences between stereo and surround sound audio modes. The multimedia device then performs at a sub-optimal level when outputting a media service, because the default audio and video modes typically offer a compromise that does not take full advantage of the capabilities of the multimedia device (for example, a DVD player operates in a stereo default mode (home quality) instead of Dolby 5.1 (movie theater quality).

The difficulty of effectively controlling the output modes of multimedia devices multiplies when connecting multiple multimedia devices. One multimedia device may not be compatible with another multimedia device when the respective modes are proprietary for a specific manufacturer and both devices are from different manufacturers. That is, a multimedia device only works with other multimedia devices made by the same manufacturer (e.g., a proprietary communications link for one manufacturer's multimedia device does not operate with the multimedia devices made by another manufacturer). Also, the output modes of two multimedia devices may be incompatible due to physical or mechanical limitations (e.g., attempting to display a 800 horizontal lines by 600 pixel image display signal on a 640 horizontal lines by 480 pixels display device).

Even if the output modes of connected multimedia devices are compatible with each other, the aggregate number and permutations of available output modes adds to the difficulty of successfully operating the multimedia devices. For example, a DVD player with four video operating modes and four audio modes connects with an audio receiver with five audio modes. In this example, the aggregate number of modes offered by the two multimedia devices is thirteen (4+4+5=13), while the permutations of output modes is eighty (4×4×5=80). The number of operating mode permutations makes it unlikely that an average multimedia device user will know how to select the operating modes of connected multimedia devices for the optimum operating efficiency.

The present invention is a system that dynamically optimizes the audio and video modes of connected multimedia devices automatically, without user intervention. In addition, the system configures itself in accordance with a characteristic of media service being outputted through the connected multimedia devices.

BRIEF DESCRIPTION OF THE DRAWINGS

FIG. 4 is a block diagram characterizing the audio and video output modes available for an undefined multimedia device.

FIG. 5 is a table of commands identifying types of multimedia devices.

FIG. 6 is a table of commands identifying audio and video output modes available from a group of multimedia devices.

FIG. 7 is a table of commands used for dynamically matching and optimizing available audio and video output modes of a plurality of connected multimedia devices.

The present invention provides an architecture for optimizing audio and video modes available from interconnected multimedia devices. For example, when a media device is connected to another multimedia device, the devices communicate with each other via a microprocessor/controller to determine audio and video modes available from both devices. Information about the audio and video modes is typically stored in the feature registry of a multimedia device. After determining the modes, the devices determine which combination of available audio and video modes provides optimal efficiency for media service playback. Devices then set and operate in the optimal modes, as determined above. If devices determine that they cannot output a media service in the optimal modes (for example, if playback of a media service requires devices to skip large groups of data), the devices will re-optimize themselves to sub-optimal modes considering a characteristic of the media service being played back.

Figure 1:
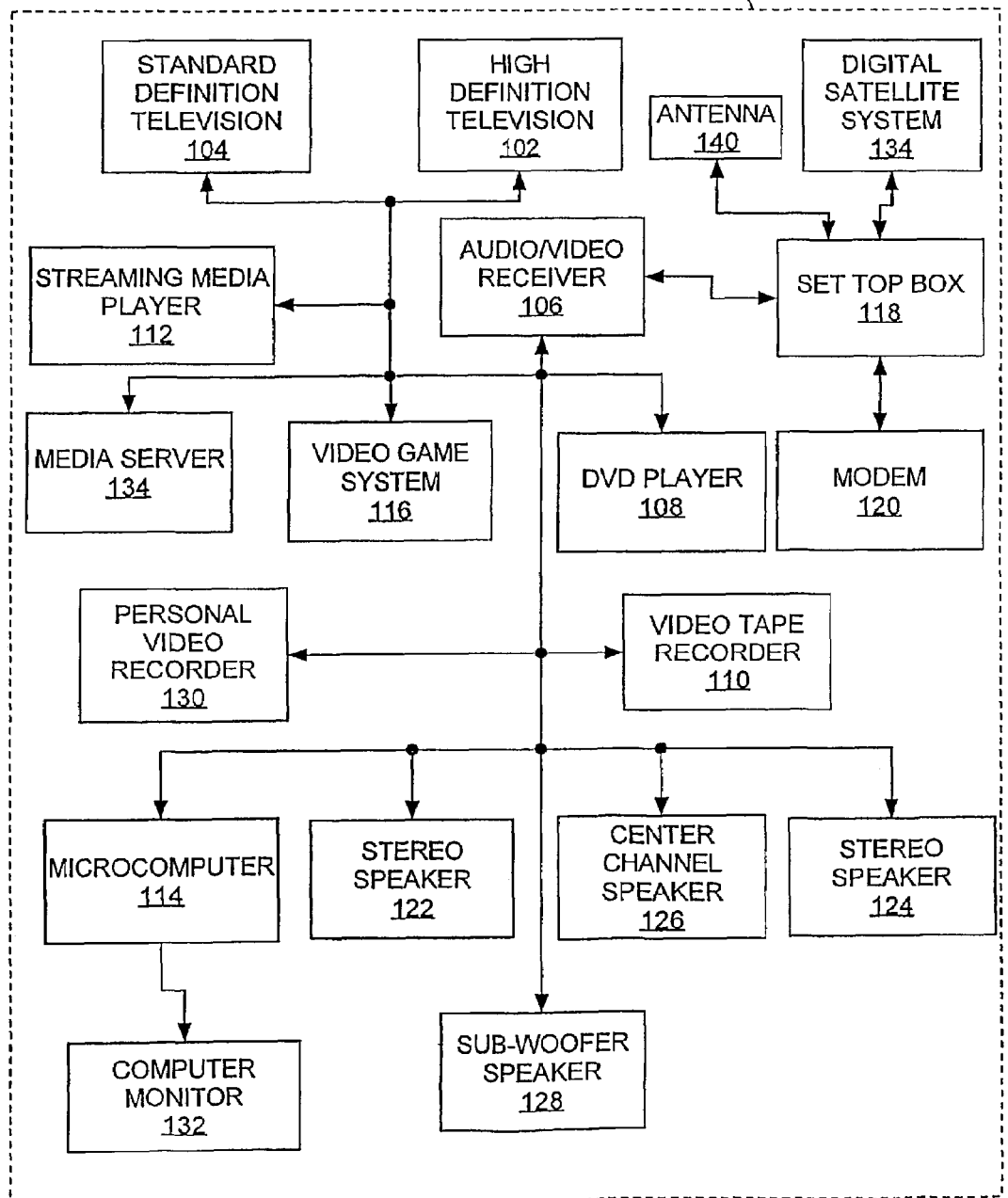
FIG. 1 is a diagram of an entertainment system comprising a plurality of connected audio or video multimedia devices.

In FIG. 1, interconnected audio and video multimedia devices in an entertainment system 100 constitute a plurality of connected multimedia devices. The multimedia devices forming entertainment system 100 are preferably connected through a wire-based interface (e.g., RCA cables, Ethernet, coaxial cable, phone lines, IEEE-1394 compliant cables, copper wire, serial cables, optical cable, USB) that provides bi-directional communication between devices. Optionally, the multimedia devices comprising entertainment system 100 communicate through a wireless interface (e.g., radio frequency, infrared, BLUETOOTH™, 802.11B, 802.11A). Alternatively, the communications are uni-directional where one multimedia device is a controller (master) and other multimedia devices (slaves) respond to the controller.

The communications between the multimedia devices comprises two levels of information: multimedia signals (media services) that are generated and processed by selected audio and video output modes available from a plurality of connected multimedia devices, and the control information used to manage the interconnected multimedia devices. The information transmitted is in digital or analog format or a combination thereof. For example, the multimedia signals generated by a DVD player 108 outputting a movie are a stereo audio signal provided as an output for a stereo audio mode and a 1080 horizontal line by 1920 pixel 60 Hz interlaced output video signal provided for a HD (high definition) video mode. The control commands are preferably JAVA™ or XML compliant signals (as shown in FIG. 5, FIG. 6, and FIG. 7) that comport to a packet-based structure (TCP/IP). These commands are capable of being processed by a data interface/controller preferably residing internal in the multimedia devices. Control information may be communicated as an electric circuit parameter (e.g., voltage, resistance, current, inductance, capacitance) and/or a change in a parameter of an electric signal (e.g., a change in resistance or voltage). As an alternative embodiment, the information transmitted on both levels of information is in the form of metadata that complies with a proprietary standard (HAVI, MPEG-7).

Set top box 118, from FIG. 1, receives media services from remote sources and distributes the services to other interconnected multimedia devices of entertainment system 100. Media services may be audio services (e.g., music, radio based talk show, streaming audio) and/or video services (e.g., television shows, movies, computer/video games) capable of being provided by entertainment system 100 in selected audio and video output modes. A remote source (e.g., satellite, Internet, cable, broadcast antenna, public switched telephone network (PSTN), cellular network, infrared transmitter), as a service provider, transmits media services signals that are received by multimedia devices including as digital satellite system 134, modem 120, and antenna 140. These devices process the media services signals and distribution through the entertainment system 100 for use by other multimedia devices connected to audio/video receiver 106, coupled to the set top box 118. Multimedia devices such as digital satellite system 134 and modem 120 may bi-directionally communicate with remote sources for requesting media services (for example, a video on demand from a cable service provider) and for performing maintenance for entertainment system 100 (e.g., downloading a new audio output mode, receiving electronic program guide information, upgrading software drivers and codecs).

Entertainment system 100 also accommodates and distributes media services available from local sources. DVD player 108, video tape recorder 110, personal video recorder 130, coupled to the audio/receiver 106, are examples of multimedia devices that provide media services locally (for example, video tape recorder 110 playing a movie from a video tape) through the use of a swappable medium (e.g., video tape, DVD, computer disc, flash memory, compact disc). Other multimedia devices such as media server 134 and a streaming media player 112, coupled to audio/receiver 106, provides locally sourced media services from a local fixed storage device (e.g., hard disc drive, optical disc, flash or static ram). Media services stored in the local storage device may be received from remote sources or from other multimedia devices connected to media server 134 and archived. Other media services are provided locally by software running on a microcomputer 114 or from video game system 116. These services are distributed to other connected multimedia devices of entertainment system 100.

Entertainment system 100 uses multimedia devices for processing and outputting media service signals in accordance with selected audio and video output modes. Audio/video receiver 106 is a multimedia device that matches a source of a media service to multimedia devices that process and output the media service in a selected audio or video output mode. For example, DVD player 108 distributes an HD video media service (of a local or remote origin) via audio/video receiver 106 to high definition television set 102. Audio/video receiver 106 preferably selects sources and multimedia devices via the use of control commands, as shown in FIG. 5, FIG. 6, and FIG. 7. Preferably audio/video receiver 106 selects standard definition television set 104 for displaying SD media service information and high definition television set 102 for displaying HD media services. Computer monitor 132 display locally generated information from microcomputer 114.

Audio media services are provided through audio multimedia devices available in the entertainment system 100. Preferably, audio media service (of local or a remote origin) is reproduced by an audio system comprising a group of loudspeakers comprising at least one of stereo speaker 122, stereo speaker 124, center channel speaker 126, and sub-woofer speaker 128. Optionally, standard definition television set 104, high definition television set 102, or the computer monitor 132 is used to output an audio media service signal via an audio component in the multimedia device (e.g., a loudspeaker). Audio/video receiver 106 can choose a group of speakers from the audio system in accordance with a selected audio output mode, wherein a second group of speakers is chosen when the selected audio output mode changes.

Figure 2:
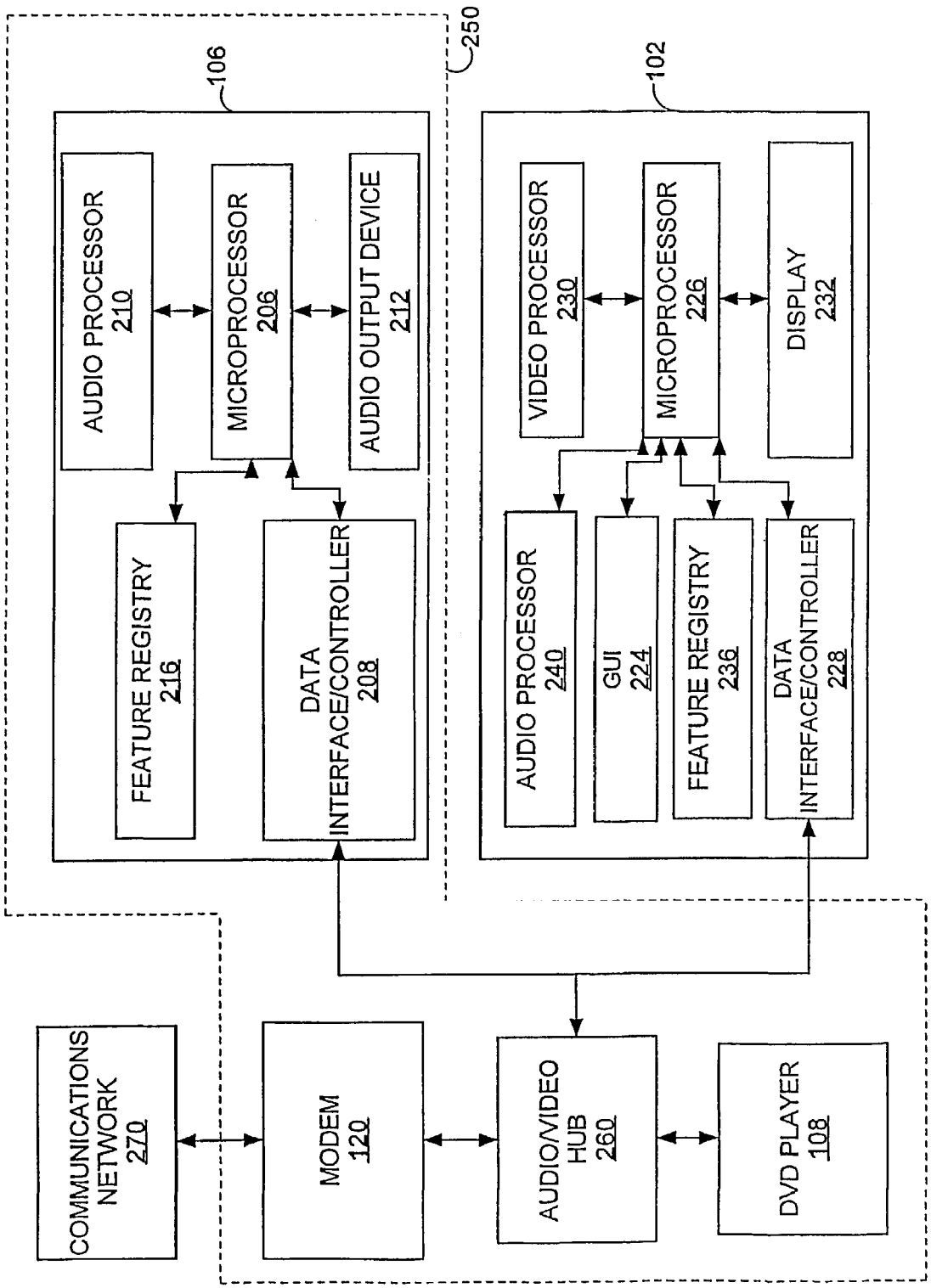
FIG. 2 is a diagram of connected multimedia devices with operating modes dynamically optimized for an outputted media service.

FIG. 2, depicts interconnected multimedia devices that dynamically optimize audio and video output modes automatically. An audio/video hub 260 interconnects multimedia devices of entertainment system 250 (modem 120, audio/video receiver 106, DVD player 108) preferably by complying with a network standard (USB, IEEE-1394, Ethernet). Bi-directional communications are provided between the multimedia devices through hub 260. Audio and video media services (source signals) are provided from a DVD player 108 via audio/video hub 260 to high definition television set 102, and audio/video receiver 106. Audio/video receiver 106 and high definition television set 102 process or output the received media services (from the DVD player 108) from other interconnected multimedia devices.

A multimedia device, such as high definition television set 102, includes a feature registry 236 that comprises information relating to the audio and video output modes supported by the multimedia device. Feature registry 236 preferably functions as an updateable buffer comprising data representing the supported modes as metadata or as a table of entries (as shown in FIGS. 5 and 6). This data is either read internally from microprocessor 226 or is capable of being communicated to other multimedia devices via data interface/controller 228 in response to a query command (for example, the QUER command displayed in FIG. 7). The supported modes may be communicated as an electric circuit parameter (e.g., voltage, resistance, current, inductance, capacitance) and/or a change such a parameter of an electric signal (e.g., a change in resistance or voltage). Information in feature registry 236 is updated as audio and video output modes of a multimedia given device are changed.

Feature registry 236 is coupled to microprocessor 226, which communicates with and controls other functional segments of high definition television set 102. Data interface/controller 228, coupled to microprocessor 226, operates as the interface that sends and receives information signals between other interconnected multimedia devices. Additionally, data interface/controller 228 parses received communications into the internal format of high definition television set 102, and transmits communications using metadata or packetized digital information. Microprocessor 226 is also connected to a digital video processor 230 that processes a received video service signal, in accordance with a selected video mode (selected by an output mode optimization described later in this specification). The processed video signal can then be output to a display 232 that is controlled by microprocessor 226. A graphical user interface (GUI 224) selects media services via an electronic programming guide (EPG) and manipulates multimedia devices (e.g., by adjusting the volume of a device, powering on/off, establishing shortcuts for favorite media services, forcing a selected audio or video operating mode). High definition television set 102 includes an audio processor 240 for processing audio media service signals.

Audio/video receiver 106 includes a microprocessor 206 that controls the other functional segments of receiver 106. Data interface/controller 208 and feature registry 216, both coupled to microprocessor 206, operate in a manner similar to data interface/controller 228 and feature registry 236 of high definition television set 102, described above. Microprocessor 206 also controls a digital audio processor 210 that processes an audio service signal in accordance with an audio mode (selected by an output mode optimization described later in this specification). Microprocessor 206 outputs the processed audio service on audio output device 212 (for example, loudspeakers). Audio processor 210 processes audio media service signals with enhancements such as environmental effects (simulating a concert hall or a rock concert) and audio signal attributes (adding/subtracting reverb, bass, treble).

Multimedia devices such as high definition television set 102 and audio/video receiver 106 interact with modem 120 via audio/video hub 260. Modem 120 functions as a gateway device with a communications network 270 (e.g., Internet, Local Area Network (LAN), Wide Area Network (WAN), Ethernet, PSTN) to a remote source. A multimedia device such as high definition television set 102 uses modem 120 for receiving/transmitting media services, system maintenance (adding/deleting output modes, updating GUI 224), and for communicating with a remote device (computer, multimedia device) accessed through communications network 270 (for example, transmitting a local media service to a server through an Internet connection).

Figure 3:
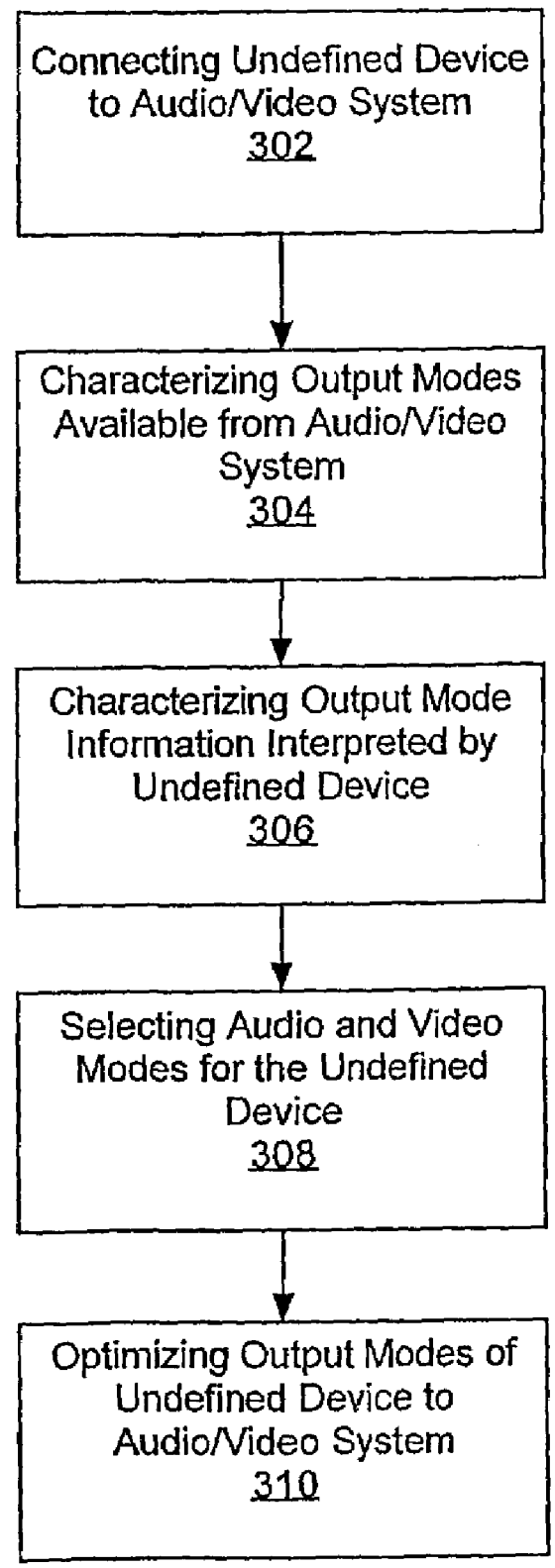
FIG. 3 is a block diagram of a method for dynamically matching and optimizing the available audio and video output modes for an undefined device connected to a plurality of connected multimedia devices.

FIG. 3 is a flowchart of a method of dynamically matching and optimizing the available audio and video output modes for an undefined device connected to a plurality of connected multimedia devices. The method of dynamically optimizing audio and video modes is explained, with respect to the multimedia devices and functional segments shown in FIG. 2. The multimedia device identification types, mode definitions, and commands referenced are shown in FIG. 5, FIG. 6, and FIG. 7.

In step 302, an undefined multimedia device is connected to an audio/video system (entertainment system 250, shown in FIG. 2). In this example, the undefined multimedia device is a high definition television set 102 that is connected to an audio/video hub 260 (of entertainment system 250) via data interface/controller 228. Once connected to audio/video hub 260, microprocessor 226 via data interface/controller 228 automatically transmits a "connecting an undefined device" command "CONN" to the multimedia devices comprising entertainment system 250, in this example audio/video receiver 106. The "CONN" command informs audio/video receiver 106 that a newly connected multimedia device requires that its audio and video output modes be identified and automatically optimized. Commands between multimedia devices are transmitted and received via a data/interface controller of a multimedia device using a network compatible protocol, and such commands are issued and interpreted by the multimedia device's microprocessor. Also, the invention supports multiple multimedia devices that respond in the same way as the audio/video receiver 106, with command adjustments made for the specific multimedia device (using the commands for a television set instead of an audio/video receiver).

In step 304, audio/video receiver 106 characterizes the multimedia devices comprising the audio/video system by identifying the multimedia devices and their corresponding audio and video output modes. Audio/video receiver 106, upon receiving the "CONN" command, responds with an "ACK" command, which acknowledges the request from the high definition television set 102. Audio/video receiver 106 then transmits a "DEVE" command identifying the multimedia devices comprising the audio/video system, followed by an "AV_RECEI" device ID, used for identifying the multimedia device as audio/video receiver 106.

Audio/video receiver 106 continues with step 304 by transmitting information referring to the audio and video output modes available from receiver 106. The available audio and video output modes are identified by a "TRAN" (transmitting available modes) command followed by identifiers representing the available modes. For example, audio/video receiver 106 supports audio playback in several audio modes: Mono Sound, Surround Sound, and Dolby 5.1. Audio/video receiver 106 transmits this information via its data interface/controller 208 to high definition television 102 by using the command string "TRAN MON_MOD SURR_MOD D5.1_MOD", identifying the available audio modes as Mono Sound (MON_MOD), Surround Sound (SURR_MOD), and Dolby 5.1 (D5.1_MOD).

The information about the output modes supported by audio/receiver 106 is stored in feature registry 216, preferably in an entry table or buffer. As the modes of audio/video receiver 106 are updated, the information in feature registry 216 is also updated. For example, audio/video receiver 106 receives a maintenance upgrade via communications network 270 that allows receiver 106 to support streaming audio (streamed MP3PRO® file format) as an audio output mode. The Mode Identification (STATE ID) for the new streaming audio mode "STRM_MOD" is stored in feature registry 216. As part of upgrade, audio processor 210 is also programmed to support the encoding and decoding processes required for enabling streaming audio as an audio output mode. The upgrade of audio processor 210 preferably is a software or flash ROM/RAM upgrade In step 306, high definition television set 102 characterizes the "DEVE" and "TRAN" commands and interprets the output mode information. Data interface/controller 228 receives the "DEVE" and "TRAN" commands and communicates the information to microprocessor 226, which determines via translation tables that the audio/video system 250 comprises audio/video receiver 106 that supports Mono Sound, Surround Sound, Dolby 5.1 (audio output modes). Microprocessor 226 stores the information describing audio/video system 250 in feature registry 236. As an optional step, microprocessor 226 asks via data interface/controller 228 if audio/video system 250 has a certain type of multimedia device or supports a particular mode. For example, high definition television 102 issues a "QUST STRE_MOD" command asking if the audio/video system 250 supports a stereo audio output mode. Microprocessor 206 checks feature registry 216 if such a mode is supported. Microprocessor 206 responds via data interface/controller 208 with an "ACKN STRE_MOD" (acknowledged) if the stereo audio mode is supported, and a "NACK STRE_MOD" (not acknowledged) if the stereo audio mode is not supported.

In step 308, high definition television 102 selects optimal audio and video output modes for its own operation. Microprocessor 226 accesses information in feature registry 236, and compares the audio and video modes available from high definition television 102 and from audio/video system 250. The comparison of modes is preferably done in accordance with a predetermined hierarchical list (see Table 1 below), stored in feature registry 236 or microprocessor 226, ranking specific combinations of audio and video modes by score. The hierarchical list is created either by a device's manufacturer or a standards committee. Microprocessor 226 generates different permutations of available audio and video modes and matches (compares) the permutations against the combinations on the predetermined hierarchical list. The permutation of available audio and video modes with the highest score (as listed on the hierarchical list) are the modes selected by microprocessor 226, for optimally operating high definition television 102 and audio/video system 250.

An example of the optimization in step 308 has microprocessor 226 (all reference numbers referring to from FIG. 2) of high definition television set 102 determining that television set 102 supports two image display modes: 1080 horizontal lines by 1920 pixels, and 720 horizontal lines by 1280 pixels. This determination is made by microprocessor 226 reading data stored in feature registry 236. Microprocessor 226 polls audio/video receiver 106 to determine what audio modes the receiver 106 supports by transmitting a query command through a communication path from microprocessor 226 to audio/video hub 260 via data interface 228. The communication path continues from hub 260 to microprocessor 206, of audio/video receiver 106, via data interface 208.

Microprocessor 206 receives the polling request and determines via data in feature registry 216 that the receiver 106 supports two audio modes: stereo and surround sound. Microprocessor 226 communicates supported audio mode information back to microprocessor 206 through the communications path. Microprocessor 206 uses this information with video mode data from feature registry 236 to generate permutations of the supported audio and video modes, the permutations being stored in feature registry 216. Microprocessor 226 matches the stored permutations against a predetermined hierarchical list displayed in Table 1, information of the list is stored in feature registry 216. Table 1 lists combinations of audio and video modes by score.

As displayed in Table 1, there are four possible permutations of audio and video modes available from high definition television set 102 and audio/video receiver 106: stereo with 1080×1920, surround sound with 1080×1920, stereo with 720×1280, and,surround sound with 720×1280. Microprocessor 226 compares the possible permutations against the list and determines that surround sound with 1080×1920 has the highest score out of any of possible permutations, hence the optimal audio and video modes. It should be noted that the list (shown in Table 1) contains information relating to modes not supported by interconnected multimedia devices, such as Dolby Digital 5.1. This information about modes may be used when microprocessor 226 recognizes that a new mode is available from an interconnected multimedia device. Microprocessor 226 then re-optimizes the audio and video modes in view of a new mode being available.

TABLE 1

| | | AUDIO MODES | | |
|---|---|---|---|---|
| | | STEREO | SURROUND SOUND | DOLBY DIGITAL 5.1 |
| VIDEO MODES | 1080 HORIZONTAL LINES BY 1920 PIXELS (1080 × 1920) | 90 | 95 | 97 |
| | 720 HORIZONTAL LINES BY 1280 PIXELS (720 × 1280) | 85 | 92 | 94 |

Optionally, the optimization of audio and video modes considers a characteristic of a media service being output by interconnected multimedia devices. Characteristic of a media service includes information such as the medium of the media service (movie, television show, radio program), encoding type of the media service (REALAUDIO™, MP3PRO™), and the bit rate of the media service (300K per sec, 150K per sec). The permutations of audio and video modes includes characteristics of a media service as a third variable that is matched against a predetermined hierarchical list, in a manner consistent with the optimization listed above.

In step 310, high definition television set 102 displayed in FIG. 2 selects and operates in accordance with the audio and video modes selected during the output mode optimization in step 308. In the current example, microprocessor 226 operates video processor 230 in a 1080 horizontal lines by 1920 pixels image display mode, as the television set 102 receives video based media service from audio/video system 250 (for example, from DVD player 108). The microprocessor 226 may instruct audio/video receiver 106 to operate in a surround sound audio mode by issuing a "STAT AV_RECEI SURR_MOD" command informing, which was selected in optimization step 308.

As an alternative embodiment, the method of dynamically matching and audio and video output modes is determined by audio/video system 250 as an already connected system instead of high definition television set 102 as an undefined multimedia device. Audio/video system 250 recognizes newly connected undefined multimedia devices and determines the audio and video outputs modes supported by the undefined multimedia devices. The audio/video system 250 then optimizes and selects supported audio and video output modes of undefined multimedia devices and audio/video system 250 in accordance with predetermined hierarchical list, as described above. Audio/video system 250 communicates the selected audio and video output modes to television set 102. These multimedia devices operate in the optimized output modes after receiving the output mode communication.

The present invention supports the an embodiment where sub-optimal modes are determined when a media service cannot be played back in the determined optimal audio and video modes, as described in step 308. The present invention repeats steps 308 and 310 until the selected modes are compatible with the media service. Continuing with the example cited above for steps 308 and 310, an optimization is performed in step 308 for connected high definition television set 102 and audio/video receiver 106 (from FIG. 2). Microprocessor 226 determines that surround sound and 1080 horizontal lines by 1920 pixels image display mode are the optimal modes. The modes are set in the respective devices in step 310 by communications from microprocessor 226. When a media service is played in the optimal modes, microprocessor 226 of television set 102 determines that the media service cannot be displayed in the chosen video mode because video processor 230 skips large groups of data during media service playback, resulting in an error condition.

The example continues with microprocessor 226 repeating step 308, by considering a characteristic of the media service. Microprocessor 226 reads transport headers of the packets comprising the media service, and determines that the media service can be displayed in a 720 horizontal lines by 1280 pixels display mode. Microprocessor 226 stores information relating to a characteristic of a media service in feature registry 236. Microprocessor 226 then re-optimizes the modes and determines that surround sound and a 720 horizontal lines by 1280 pixels display mode are next, best optimal modes (sub-optimal). Step 310 is repeated by microprocessor 226, setting the sub-optimal modes. Microprocessor 226 may repeat steps 308 and 310 until the determined sub-optimal modes support a media service without errors resulting.

FIG. 4 shows a block diagram of a method for characterizing the audio and video output modes available for a multimedia device. Preferably, a multimedia device (such as high definition television set 102) characterizes its own audio and video modes prior to being connected to other multimedia devices of entertainment system 250. In step 402, microprocessor 226 (displayed in FIG. 2) operates in a diagnostic mode that tests various audio and video processors, such as video processor 230 and audio processor 240, with sample data representing sample media services.

The characterization of audio and video output modes is separated into the steps of defining audio modes (410) and the defining video modes (420). In step 410, microprocessor 226 transmits sample audio data (representing sample media service) to audio processor 240. Microprocessor 226 instructs audio processor 240 to process the sample data as a media service corresponding to a specific audio output mode (steps 412-418). For example in step 412, sample audio data is processed in a Dolby 5.1 output mode yielding a Dolby 5.1 media service. In step 416, the sample audio data is processed in a surround sound audio output mode yielding a surround sound media service.

Microprocessor 226 characterizing video output modes in steps 422-428 and steps 432-434 together with video processor 230, in a manner consistent with the characterization of the audio output modes as noted above. Microprocessor 226 instructs video processor 230 to process sample video data as a video media service corresponding to a video output mode (steps 422-428). Microprocessor 226 also determines if video based media services are capable of being displayed as an interlaced picture (step 432) or as a progressive picture (step 434).

In step 440, microprocessor 226 determines if the output audio and video based media services are within acceptable parameters for a corresponding audio or video output mode. For example, microprocessor 226 tests a media service in a 1080 horizontal lines by 1920 pixels image display mode that was generated in step 426. If during playback, the video media service yields a 5% or greater error rate, the microprocessor 226 will fail this media service and note this failure in feature registry 236. If the playback of the video media service is below a 5% error rate, microprocessor 226 will pass this media service. Microprocessor 226 records in the feature registry 236 that the 1080 horizontal lines by 1920 pixels video mode is supported.

If microprocessor 226 determines that an audio or video output mode is not supported, microprocessor 226 may request a maintenance upgrade from a remote server available through communications network 270. The maintenance upgrade comprises information to update the processors coupled to microprocessor 226 to operate in the output mode that was previously not supported. As an alternative embodiment, the audio and video output modes for a multimedia device are determined by another connected multimedia device (for example, audio/video receiver 106) in a manner consistent with the method described above.

FIG. 5 shows a table 500 of commands identifying types of multimedia devices. The commands are preferably communicated as a string of 8-byte alphanumeric characters.

FIG. 6 shows a table 600 of commands identifying audio and video modes available from a sample set of multimedia devices. The commands are preferably communicated as a string of 8-byte alphanumeric characters.

FIG. 7 shows a table 700 of commands used for communicating between connected multimedia devices for dynamically matching and optimizing supported audio and video output modes. The commands are communicated as a string of 4-byte alphanumeric characters.

The commands listed in FIG. 5, FIG. 6, and FIG. 7 are bi-directly communicated between interconnected multimedia devices. The syntax of the communications is either a single command or a combination of commands. Preferably, the syntax of combination of commands is transmitted in the following format: "OPERATION DEVICE_ID STATE_ID (1) STATE_ID (2) . . . ". For example, the command for high definition television set 102 to operate in a 1080×1920 resolution, 60 HZ progressive picture rate format is "SEST HIDEF_TV 10801920 60_PROGE". In accordance with the principles of the present invention, other multimedia devices, audio and video output modes, operating commands, and communication syntaxes, not listed, are supported in a manner consistent with the examples given above.

What is claimed is:

1. A system for automatically optimizing audio and video operating modes for output by at least one multimedia device, comprising:

a microprocessor for controlling output modes and functional segments of said at least one multimedia device, wherein said microprocessor queries said at least one multimedia device to determine said modes that are available;

a feature registry comprising information referring to said modes available for output from said at least one multimedia device; and a processor providing a selected optimized output mode from audio and video modes available for output by said at least one multimedia device in response to an instruction from said microprocessor, wherein said processor selects the selected optimized output mode using a characteristic of a media service to be playback in accordance with a predetermined hierarchical order of audio and video modes, wherein said microprocessor selects said selected optimized output state by generating permutations of said available audio and video modes.

2. The system of claim 1, wherein said characteristic of said media service is at least one of: encoding type, and bit rate of said media service.

3. The system of claim 1, wherein said feature registry is a functional segment of said multimedia device.

4. The system of claim 1, wherein said processor is a functional segment of said multimedia device.

5. The system of claim 1, wherein said microprocessor compares said permutations with the predetermined hierarchical order ranking combinations of audio and video modes.

6. The system of claim 1, where said query is transmitted to a multimedia device that is newly connected to said system in order to determine the output modes of said connected multimedia device.

7. The system of claim 1, further comprising:
a data interface for communicating with said at least one multimedia device, wherein said data interface/controller is a functional segment of said multimedia device.

8. The system of claim 7, wherein:
said data interface communicates with said at least one multimedia device via use of at least one of metadata, device ID, mode ID, and operation command.

9. The system of claim 7, wherein:
said multimedia device receives a maintenance upgrade via said data interface for updating said available audio and video output modes, wherein said upgrade is at least one of: adding an audio or video output mode, and deleting an audio or video mode output mode.

10. The system of claim 7, wherein said multimedia device receives
a communication from a plurality of connected multimedia devices, said communication being at least one of: a parameter of an electric circuit and a change in said parameter of an electric circuit.

11. The system of claim 1, further comprising:
a graphical user interface for selecting a media service via an electronic programming guide.

12. The system of claim 1, further comprising:
a graphical user interface for manipulating said multimedia device.

13. The system of claim 12, wherein said manipulating said multimedia device by means of least one of: adjusting audio volume, powering on or off said multimedia device, establishing shortcuts for a favorite media service, and forcing an available audio or video output mode.

14. A system for automatically optimizing audio and video operating modes for output by at least one multimedia device, comprising:
a microprocessor for controlling output modes and functional segments of said at least one multimedia device, wherein said microprocessor queries said at least one multimedia device to determine said modes that are available;
a feature registry comprising information referring to said modes available for output from said at least one multimedia device; and
a processor providing a selected optimized output mode from audio and video modes available for output by said at least one multimedia device in response to an instruction from said microprocessor, wherein
said processor selects the selected optimized output mode using a characteristic of a media service to be playback in accordance with a predetermined hierarchical order of audio and video modes, and wherein said microprocessor selects a sub-optimal mode when a media service is incompatible with said optimal modes because at least one of said optimal output mode is not available.

15. The system of claim 1, wherein said microprocessor is combined with a functional segment.

16. The system of claim 1, wherein the characteristic of the media service is metadata that is transmitted as part of said media service.

17. A method for automatically optimizing audio and video operating modes for output by a plurality of multimedia devices, comprising the steps of:
querying said plurality of multimedia devices as to determine the operating modes of said devices;
storing results of said query;
determining a characteristic of a media service to be played back;
selecting from said stored query results an optimized output audio mode and optimized video mode for playing back the media service using the determined characteristic in accordance with a predetermined hierarchical order of audio and video modes available for outputting the media service;
communicating an instruction to select said optimized audio mode and said optimized video; and
selecting at least one of a sub-optimal audio mode and sub-optimal video mode when a media service is incompatible with said optimal modes because at least one of said optimized audio mode and optimized video mode is not available.

18. The method of claim 17, wherein said communicated instruction is communicated to an device capable of outputting said media service at least one of the selected optimized audio mode and the selected video mode.

19. The apparatus of claim 16, wherein said metadata transmitted as part of a streamed media service that is delivered on demand.

* * * * *